(12) United States Patent
Kwon et al.

(10) Patent No.: US 8,089,592 B2
(45) Date of Patent: Jan. 3, 2012

(54) METHOD OF FORMING A FULL COLOR LAYER BY INJECTING LIQUID CRYSTALS HAVING SAME PROPERTIES INTO THE SPACES BETWEEN THE PARTITION SPACERS

(75) Inventors: Soon Bum Kwon, Gunpo-si (KR); Gwan Sik Min, Asan-si (KR); Hee Suck Cho, Daegu (KR)

(73) Assignee: NDIS Corporation, Chungcheongnam-do (KR)

( * ) Notice: Subject to any disclaimer, the term of this patent is extended or adjusted under 35 U.S.C. 154(b) by 981 days.

(21) Appl. No.: 11/985,575

(22) Filed: Nov. 14, 2007

(65) Prior Publication Data

US 2008/0212014 A1   Sep. 4, 2008

Related U.S. Application Data

(63) Continuation-in-part of application No. PCT/KR2006/002134, filed on Jun. 2, 2006.

(30) Foreign Application Priority Data

Jun. 2, 2005  (KR) .................. 10-2005-0047326

(51) Int. Cl.
*G02F 1/1335* (2006.01)
*G02F 1/1339* (2006.01)
(52) U.S. Cl. ........ 349/115; 349/106; 349/155; 349/156; 349/157; 257/72; 257/435; 430/7
(58) Field of Classification Search .................. 349/106, 349/155–157, 115; 257/72, 435; 430/7
See application file for complete search history.

(56) References Cited

U.S. PATENT DOCUMENTS

| | | | | |
|---|---|---|---|---|
| 5,625,473 A | * | 4/1997 | Kondo et al. | 349/86 |
| 5,942,154 A | | 8/1999 | Kim et al. | |
| 6,304,309 B1 | * | 10/2001 | Yamanaka et al. | 349/156 |
| 7,391,489 B2 | * | 6/2008 | Kume et al. | 349/129 |
| 7,492,435 B2 | * | 2/2009 | Jeon | 349/155 |
| 2004/0223110 A1 | * | 11/2004 | Otani et al. | 349/156 |
| 2005/0179853 A1 | * | 8/2005 | Chen et al. | 349/155 |

FOREIGN PATENT DOCUMENTS

| | | |
|---|---|---|
| JP | 2000-267063 | 9/2000 |
| JP | 2000-267142 | 9/2000 |
| JP | 2001-209073 | 8/2001 |

OTHER PUBLICATIONS

PCT/KR2006/002134 International Search Report; Oct. 16, 2006.

* cited by examiner

*Primary Examiner* — Huyen Ngo
(74) *Attorney, Agent, or Firm* — Kevin D. Jablonski; Graybeal Jackson LLP

(57) ABSTRACT

Disclosed is a full color liquid crystal display, including a lower substrate and an upper substrate facing each other, partition spacers uniformly arranged between the lower substrate and the upper substrate to form a plurality of spaces while maintaining a cell gap between the lower substrate and the upper substrate, a lower transparent electrode and an upper transparent electrode respectively provided to the lower substrate and the upper substrate in the spaces defined by the partition spacers so as to face each other, subpixels having liquid crystals which are able to reflect or absorb respective specific light wavelengths and which are separately received in the spaces defined by the partition spacers, a plurality of such subpixels constituting a single pixel to exhibit full color.

5 Claims, 14 Drawing Sheets

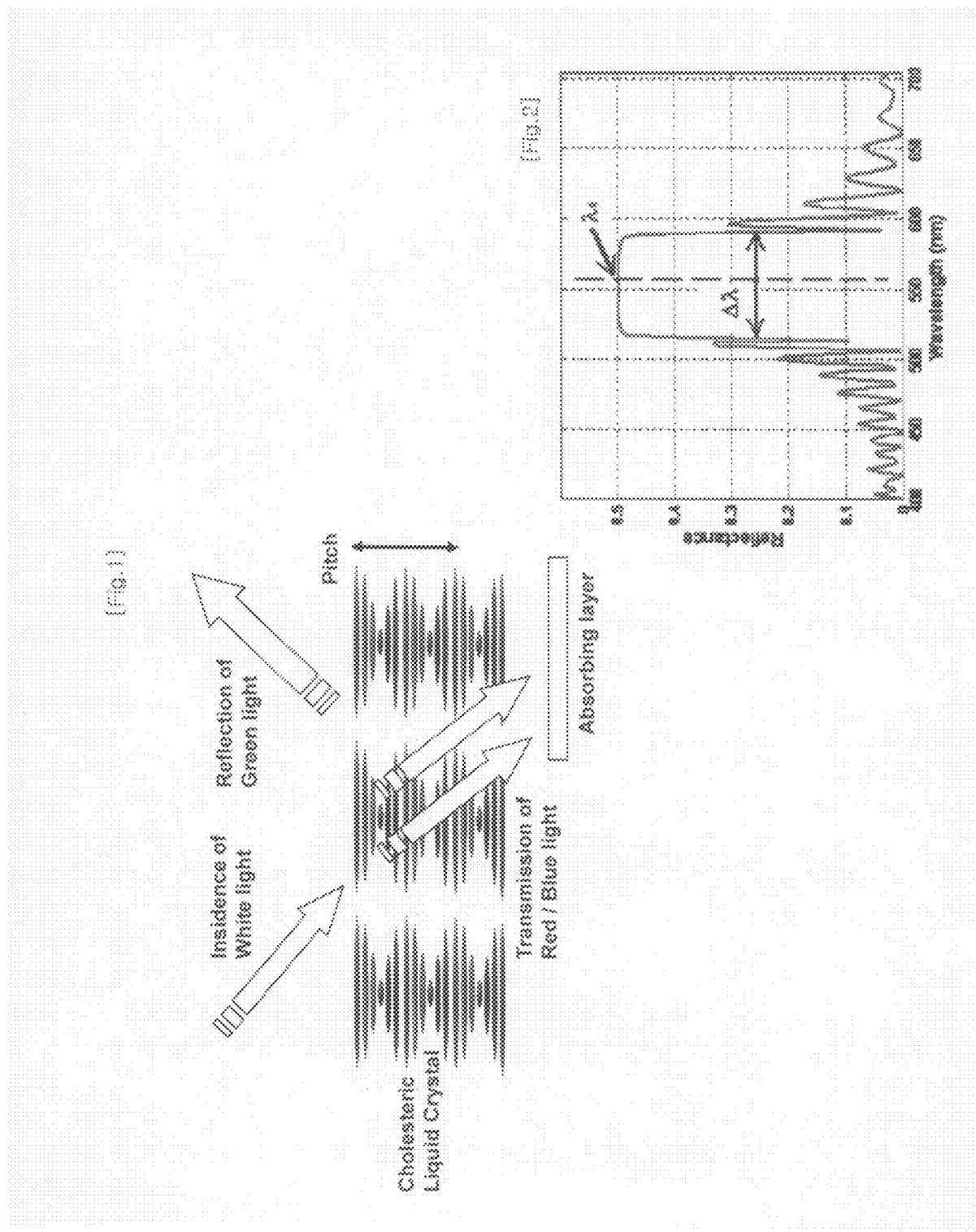

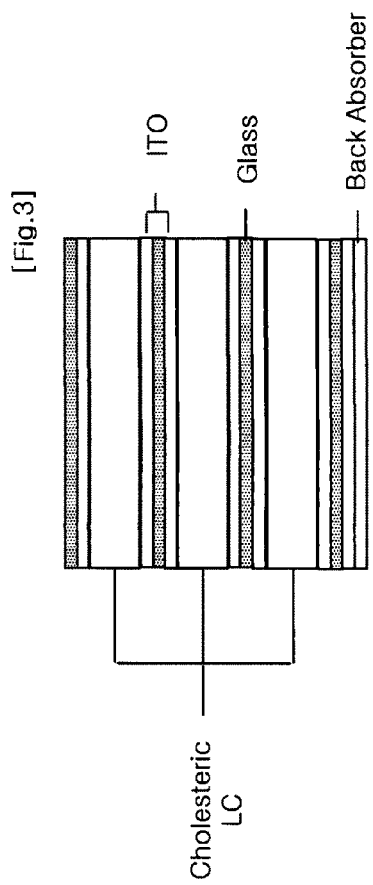
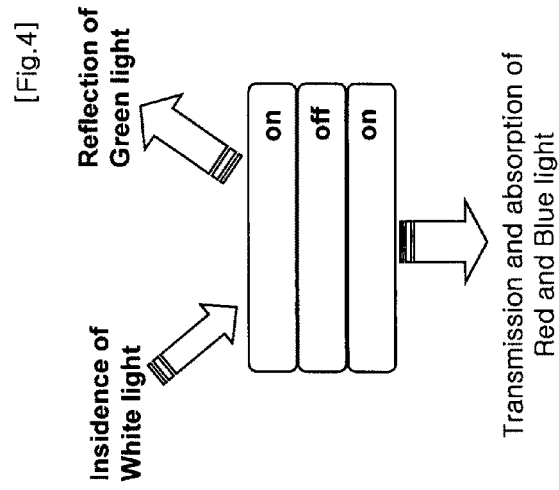

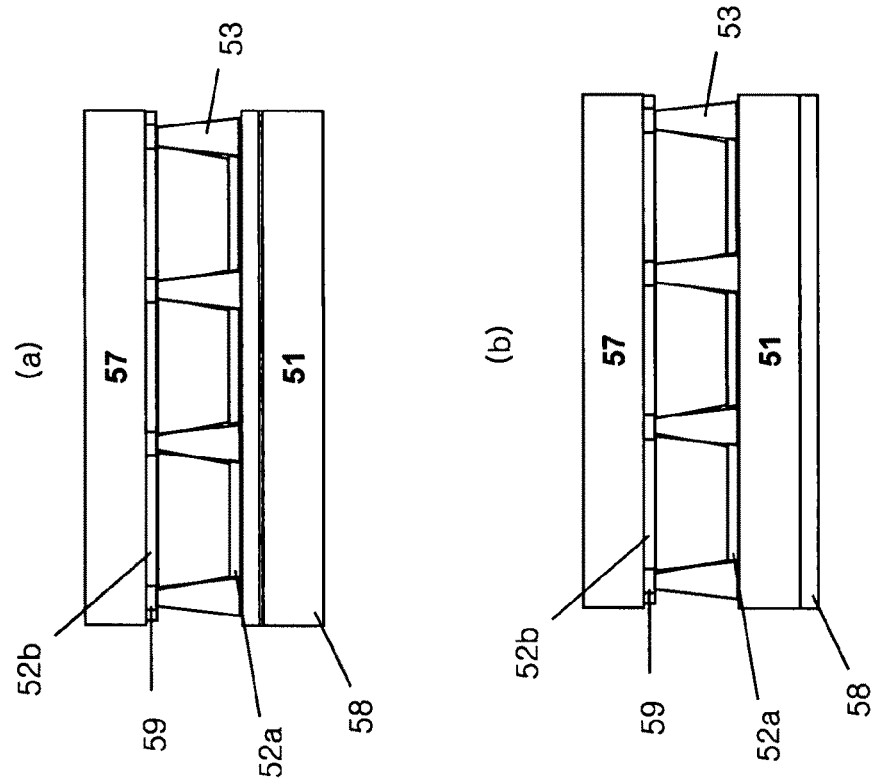

[Fig.6]
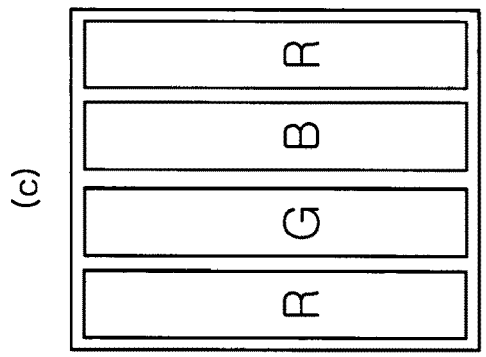
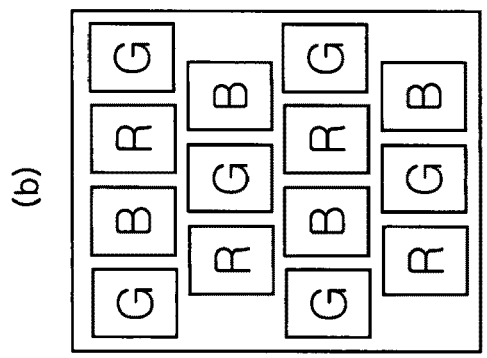
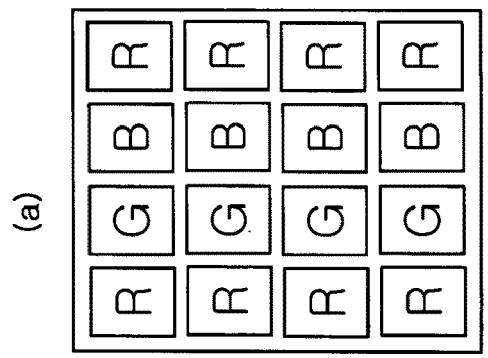

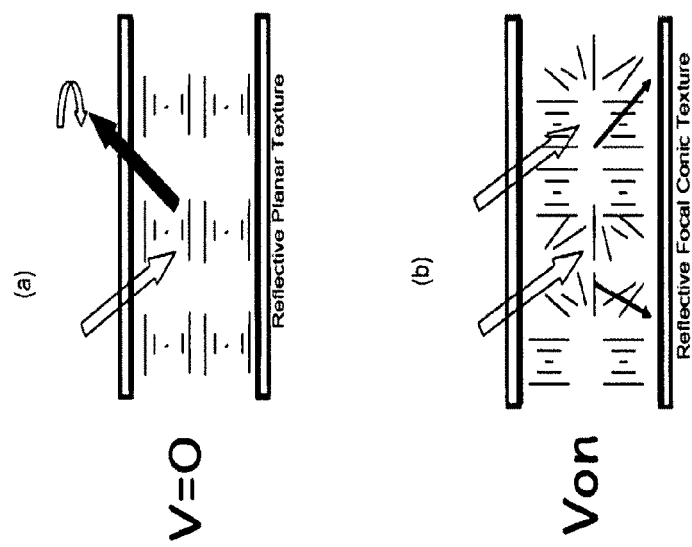

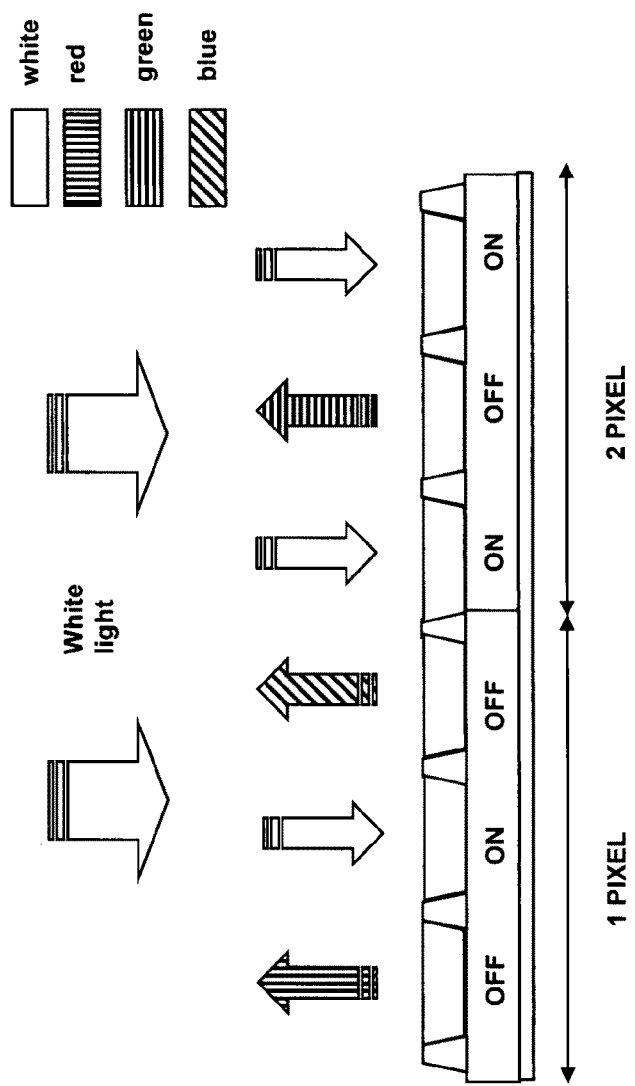

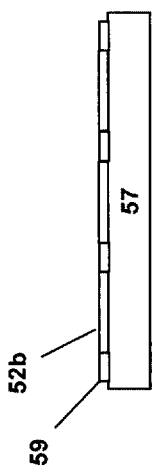
[Fig.11]
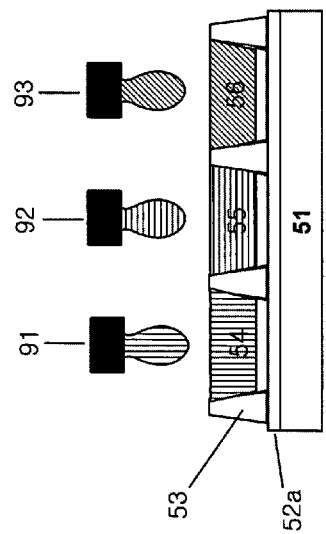
[Fig.9]
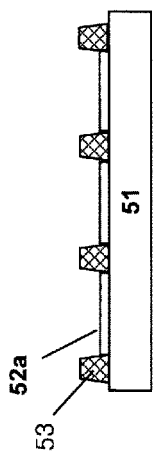
[Fig.12]
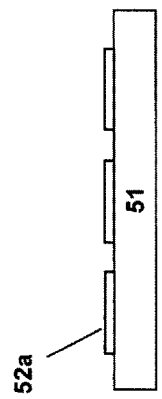
[Fig.10]

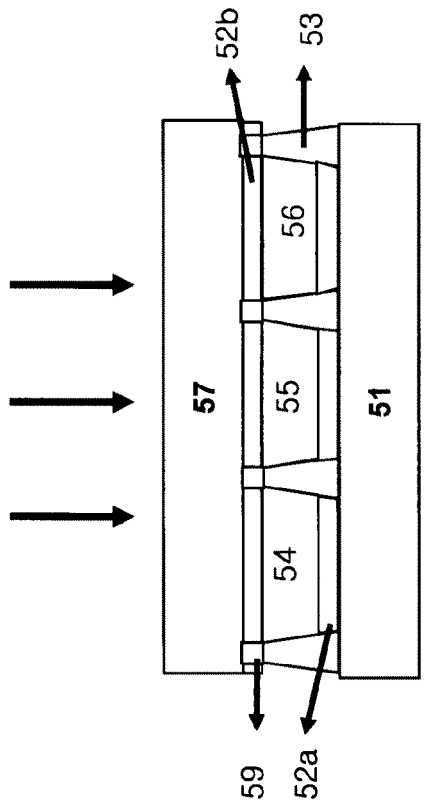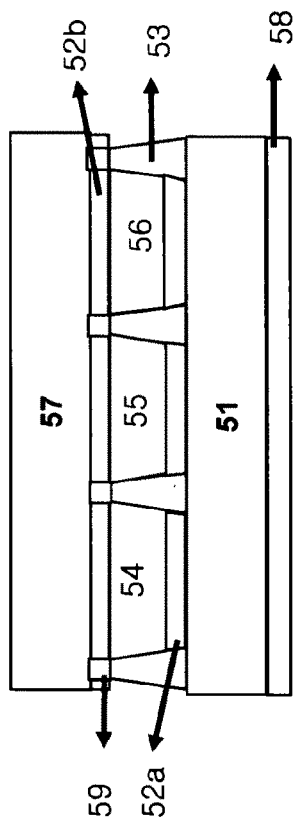

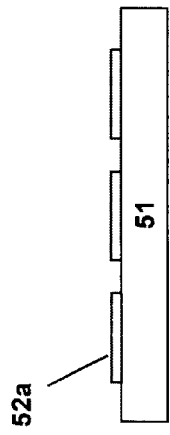
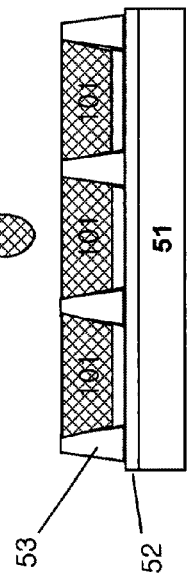
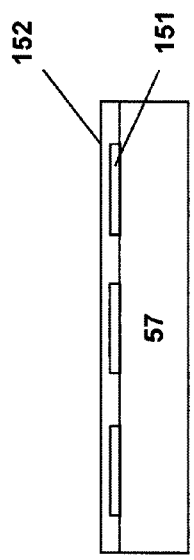
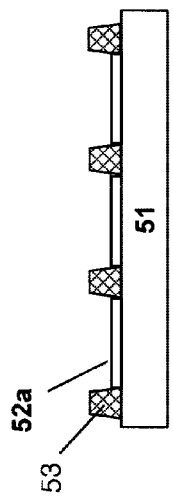

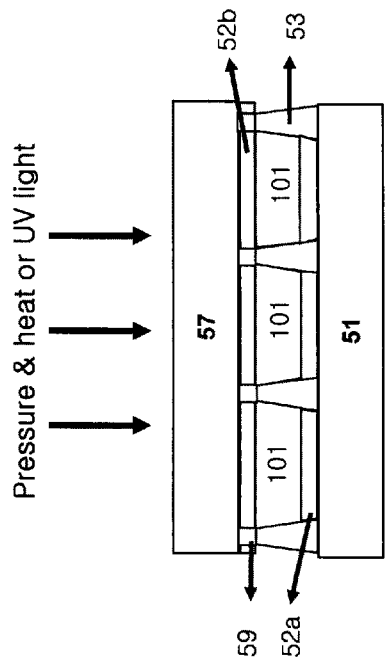
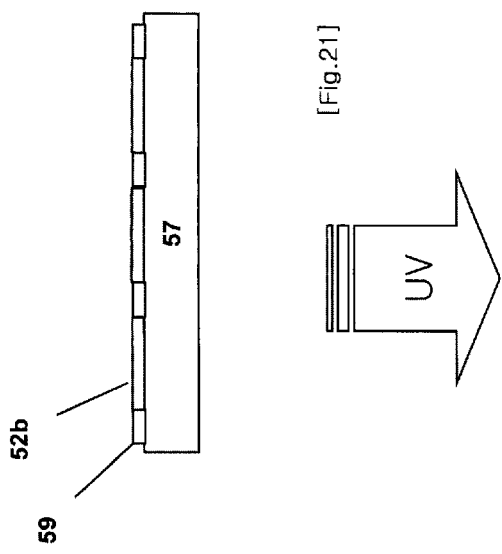
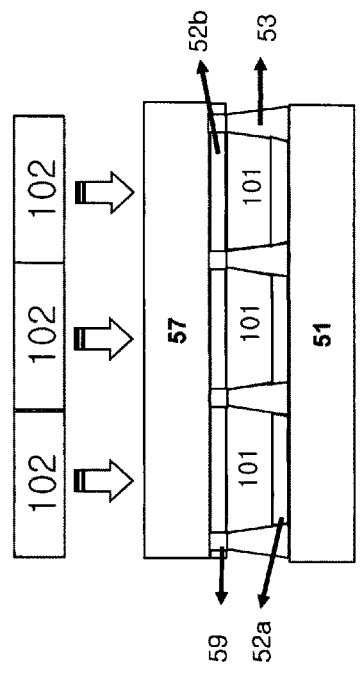

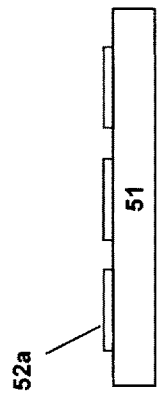
[Fig.23]
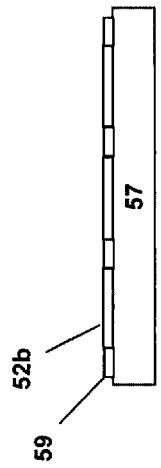
[Fig.25]
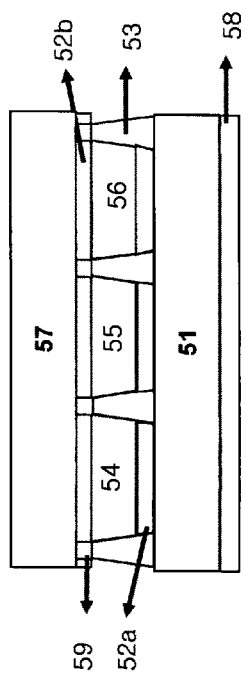
[Fig.22]
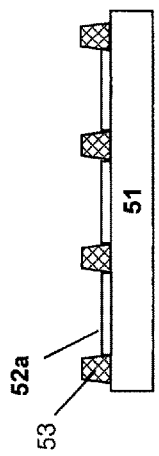
[Fig.24]

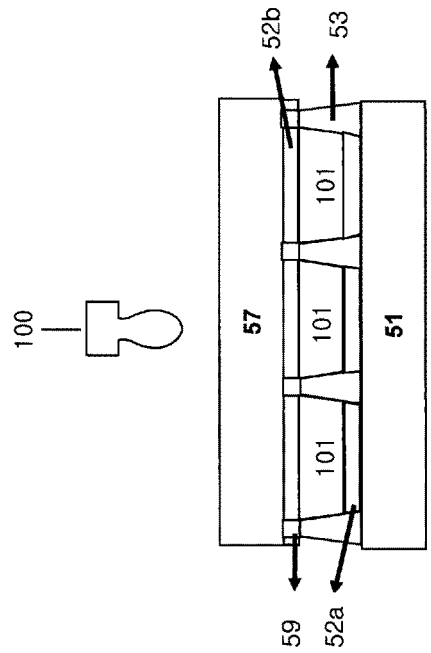
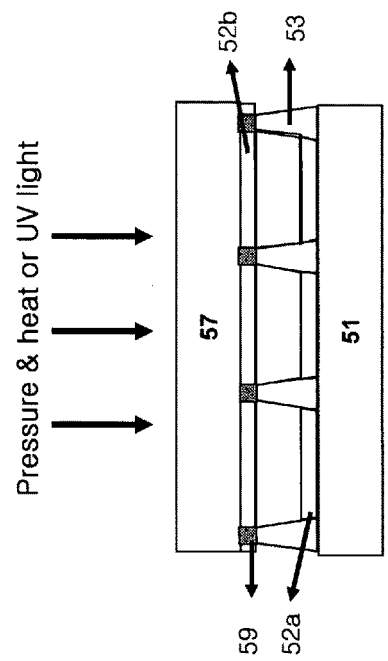

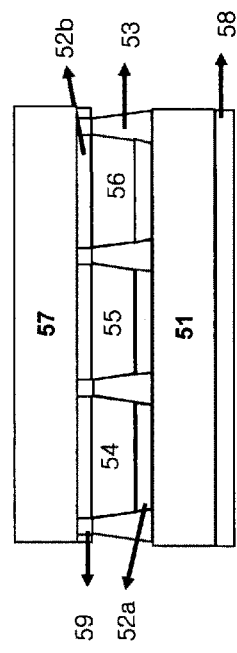
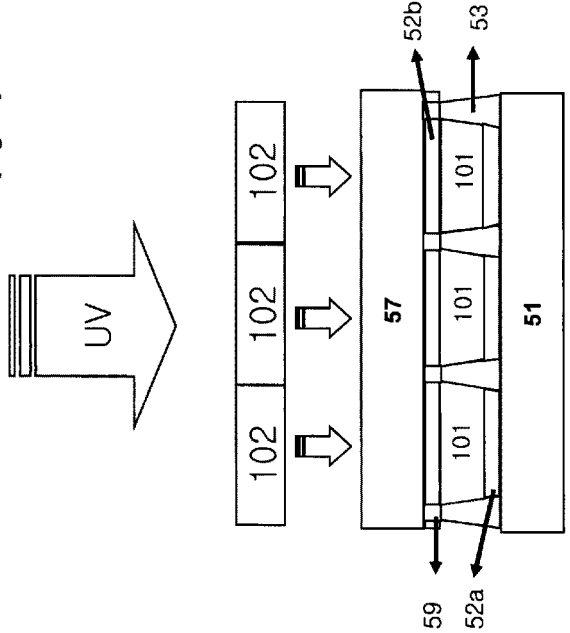

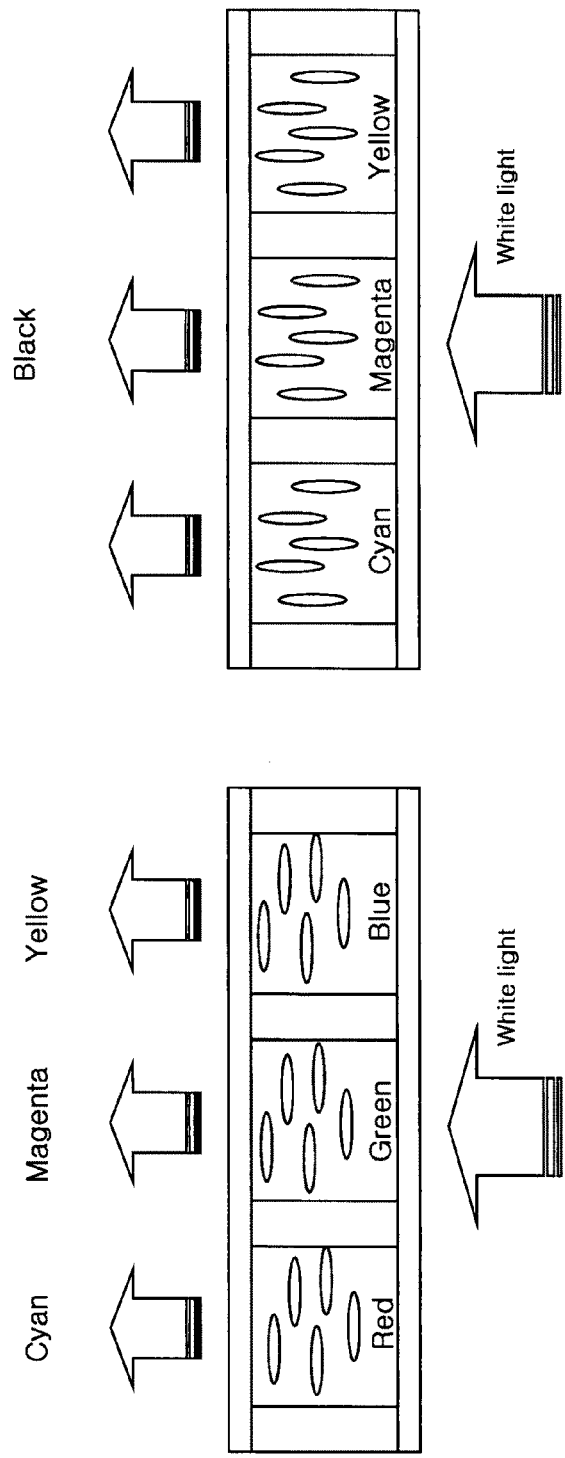

US 8,089,592 B2

METHOD OF FORMING A FULL COLOR LAYER BY INJECTING LIQUID CRYSTALS HAVING SAME PROPERTIES INTO THE SPACES BETWEEN THE PARTITION SPACERS

PRIORITY CLAIM

This is a continuation-in-part application which claims priority from PCT/KR2006/002134, filed 2 Jun. 2006, based on Korean patent Application No. 10-2005-0047326, filed 2 Jun. 2005, which are incorporated herein by reference.

TECHNICAL FIELD

The present invention relates to a full color LCD (Liquid Crystal Display) and a method of fabricating the same, and more particularly, to a horizontal type full color LCD using cholesteric liquid crystals and a method of fabricating the same.

BACKGROUND ART

Typically, an LCD is mainly exemplified by a thin film transistor (TFT) LCD, which has excellent color reproducibility and is thin. A general TFT-LCD is known to be a transmissive LCD, which includes a TFT array substrate, serving as a lower substrate, and a color filter substrate, serving as an upper substrate.

In the TFT-LCD, a backlight unit positioned under the lower substrate is used as a light source. Only about 7% of the light produced from the backlight unit is actually radiated onto a screen while it passes through the TFT array substrate and the color filter substrate. Thus, with the goal of fabricating an LCD having high luminance, since the backlight unit is required to be brighter, the power consumption of the backlight unit is increased. Further, a battery suitable for use in supplying power to the backlight unit has drawbacks, such as heaviness and a limited service time.

To solve these problems, research and development on reflective LCDs that do not use backlight units is being conducted these days.

Since the reflective LCD is operated using external light, it may drastically decrease the power consumption of the backlight unit, and thus it may be portably used for a long period of time.

The reflective LCD is composed of a reflection plate or reflection electrode having opacity and reflection properties. The reflective LCD realizes an image in such a manner that external light is passed through a color filter substrate, reflected through a reflection plate or reflection electrode provided to the lower substrate, and then transmitted through the color filter substrate. In this way, the reflective LCD suffers from drastically lowered luminance because external light is passed two times through the color filter, and thus light transmittance is decreased.

Therefore, the intention is to overcome the above-mentioned problems by making the color filter substrate thin so as to achieve high transmittance and low color purity. However, there are limitations on the fabrication of the color filter to a predetermined thickness or thinner due to the properties of the resin used in the color filter.

Accordingly, research and development on LCDs that have no color filter substrate and use cholesteric liquid crystals, which are able to selectively reflect or transmit light, has been recently conducted. Such cholesteric LCDs, exemplified by a reflective LCD using Bragg reflection, are now drawing attention as a low power consumption LCD thanks to the bistable orientation state (bistability) thereof.

The liquid crystal molecules generally have a liquid crystal phase that varies with the texture and composition thereof, the liquid crystal phase being affected by the temperature and concentration. The liquid crystals or liquid crystal phases, which have been thoroughly studied and applied to date, include, for example, nematic liquid crystals, in which liquid crystal molecules are orderly aligned in a predetermined direction. Such nematic liquid crystals are generally applied to commercially available LCDs.

In contrast, cholesteric liquid crystals are liquid crystals having a distorted liquid crystal molecular axis or having a distorted director configuration of the nematic liquid crystals because the nematic liquid crystals are mixed with chiral molecules, in which the original molecular phase and the reflected molecular phase are different from each other.

Further, the nematic liquid crystal phase is composed of liquid crystal molecules orderly aligned in the predetermined direction.

In contrast, the cholesteric liquid crystals have a layered structure, in which the liquid crystals of respective layers manifest typical nematic ordering. However, interlayer liquid crystals are arranged to be rotated in one direction, and interlayer reflectance varies as a result of such rotation. The difference in reflectance may result in the exhibition of color through reflection and interference of light.

FIG. 1 is a view showing the principle of the cholesteric LCD.

The cholesteric liquid crystals are twisted into a helical structure. The length required for the director to rotate through 360° is referred to as the pitch, which is a parameter determining the hue of the cholesteric liquid crystals. The cholesteric LCD has a continuous arrangement of layers of liquid crystals having the same pitch, and may selectively reflect light of a wavelength equal to that of the helical pitch length according to Bragg's law.

As such, the selectively reflected central wavelength ($\lambda$) is represented as a function ($\lambda$=n(avg)×pitch) of the pitch and the average refractive index (n(avg)) of the cholesteric liquid crystals. For example, in the case where the average refractive index is 1.5 and the pitch of the cholesteric liquid crystals is about 370 nm, the reflective central wavelength is determined to be about 555 nm. When external white light enters the cholesteric liquid crystals, as shown in FIG. 1, green light is reflected, while red light and blue light are transmitted and absorbed by the absorbing layer, leading to exhibition of green color. Moreover, a wavelength width ((( ) is obtained by multiplying an anisotropic refractive index ((n) and pitch. The selective reflection properties of the cholesteric liquid crystals are shown in the graph of FIG. 2.

The selectively reflected central wavelength and the wavelength width thereof depend on the pitch and anisotropic refractive index of the cholesteric liquid crystals. In general, red, green and blue colors are determined by the pitch of the cholesteric liquid crystals.

In order to realize full color, the cholesteric LCD is constructed by superimposing three cholesteric LCDs having different pitches as shown in FIG. 3. The respective cholesteric liquid crystal layers are controlled with respect to the pitch so as to exhibit specific colors thereof. Additionally, ITO (indium tin oxide) and a glass substrate are provided between the cholesteric liquid crystal layers, and an absorbing layer is provided beneath a lower substrate. As such, power is separately applied to respective cholesteric liquid crystal layers. When power is applied, the liquid crystal orientation of the cholesteric liquid crystal layer has a focal conic texture, and thus the color corresponding to that layer is transmitted and absorbed. On the other hand, when no power is applied, the liquid crystal orientation of the cholesteric liquid crystal layer has a planar texture and therefore the color corresponding to that layer is reflected.

FIG. 4 is a view showing the exhibition of full color by the cholesteric LCD of FIG. 3. When power for a red layer and a blue layer is turned on and power for a green layer is turned off, green light among incident white light is reflected, and red light and blue light thereof are transmitted and absorbed by the absorbing layer. In this way, when power to be applied to respective layers is appropriately controlled, the reflectance of individual colors (red, blue, green) may be adjusted, therefore realizing full color.

However, as in FIG. 3, when the three LCDs are superimposed, they are thickened and have inefficient driving properties, thereby increasing the cost of fabricating color LCDs.

Technical Problem

Accordingly, the present invention has been made keeping in mind the above problems occurring in the related art, and objects of the present invention are to provide a horizontal type full color LCD using cholesteric liquid crystals, and a method of fabricating the same.

Technical Solution

In order to accomplish the above objects, the present invention provides a full color LCD, comprising a lower substrate and an upper substrate facing each other; partition spacers uniformly arranged between the lower substrate and the upper substrate to form a plurality of spaces while maintaining a cell gap between the lower substrate and the upper substrate; a lower transparent electrode and an upper transparent electrode respectively provided to the lower substrate and the upper substrate in the spaces defined by the partition spacers so as to face each other; subpixels having liquid crystals which are able to reflect or absorb respective specific light wavelengths and which are separately received in the spaces defined by the partition spacers, a plurality of such subpixels constituting a single pixel to exhibit full color.

In addition, the present invention provides a method of fabricating a full color LCD, comprising a lower substrate formation step of forming a lower transparent electrode on a lower substrate at a portion where subpixels are formed; a space formation step of uniformly arranging partition spacers on the lower substrate in a portion where no lower transparent electrode is formed to form spaces between the partition spacers; an upper substrate formation step of forming an upper transparent electrode on an upper substrate at a portion facing the lower transparent electrode; an adhesive layer formation step of forming an adhesive layer on the upper substrate at a portion facing the partition spacers; an attachment step of inverting a product of the adhesive layer formation step and aligning it with a product of the space formation step such that the partition spacers face the adhesive layer and the lower transparent electrode faces the upper transparent electrode to attach the products to each other; and a color liquid crystal layer formation step of separately receiving liquid crystals able to reflect or absorb respective specific light wavelengths into the spaces defined between the partition spacers to form subpixels, and forming a color liquid crystal layer such that a single pixel composed of a plurality of adjacent subpixels exhibits full color.

Advantageous Effects

According to the present invention, subpixels are formed using partition spacers, and liquid crystals exhibiting different colors are separately filled in the respective subpixels, such that a single pixel composed of a plurality of such subpixels can exhibit full color. Thereby, a full color LCD having no color filter can be realized.

DESCRIPTION OF DRAWINGS

FIG. 1 is a view showing the principle of a cholesteric LCD;

FIG. 2 is a graph showing the selective reflection properties of cholesteric liquid crystals;

FIG. 3 is a view showing the structure of a conventional reflective full color LCD using cholesteric liquid crystals;

FIG. 4 is a view showing the exhibition of full color by the reflective full color LCD of FIG. 3;

FIG. 5 is a view showing the structure of a reflective full color LCD according to the present invention;

FIG. 6 is a view showing the structure of partition spacers;

FIG. 7 is a view showing the operation of a color liquid crystal layer using cholesteric liquid crystals;

FIG. 8 is a view showing the exhibition of full color by the LCD, in which three color liquid crystal layers, subpixels, constitute a single pixel;

FIGS. 9 to 14 are views showing the process of fabricating the reflective full color LCD according to a first embodiment of the present invention;

FIG. 15 is a view showing another example of an upper transparent electrode and an adhesive layer deposited on an upper substrate;

FIGS. 16 to 22 are views showing the process of fabricating the reflective full color LCD according to a second embodiment of the present invention;

FIGS. 23 to 29 are views showing the process of fabricating the reflective full color LCD according to a third embodiment of the present invention; and FIG. 30 is a view showing the operation of the color liquid crystal layer using guest-host liquid crystals.

MODE FOR INVENTION

Hereinafter, a full color LCD and a fabrication method thereof, according to the present invention, are described with reference to the appended drawings.

FIG. 5 is a view showing the structure of a reflective full color LCD according to the present invention.

The reflective full color LCD comprises a lower substrate 51 and an upper substrate 57 facing each other, partition spacers 53 uniformly arranged between the lower substrate 51 and the upper substrate 57 to form a plurality of spaces so as to provide a plurality of subpixels between the lower substrate 51 and the upper substrate 57 while maintaining a cell gap therebetween, a lower transparent electrode 52a and an upper transparent electrode 52b respectively provided to the lower substrate 51 and the upper substrate 57 in the spaces defined by the partition spacers 53, a color liquid crystal layer received in the subpixels formed by the partition spacers 53 to reflect respective specific light wavelengths so as to enable a single pixel composed of the plurality of subpixels to exhibit full color, an absorbing layer 58 formed beneath the color liquid crystal layer, and an adhesive layer 59 to attach the partition spacers 53 of the lower substrate 51 to the upper substrate 57.

In the case where the reflective full color LCD thus structured has no absorbing layer, a transmissive full color LCD, in which the liquid crystal layer functions to transmit respective specific light wavelengths to exhibit full color, may be fabricated. In addition, the reflective full color LCD is combined with the transmissive full color LCD, therefore fabricating a transflective full color LCD.

The color liquid crystal layer includes a red liquid crystal layer 54, a green liquid crystal layer 55, and a blue liquid crystal layer 56. Further, such three color liquid crystal layers constitute a single pixel, and thus every pixel can exhibit full color. In the drawing, although a red liquid crystal layer, a green liquid crystal layer, and a blue liquid crystal layer constitute one pixel, the present invention is not limited thereto. A cyan liquid crystal layer, a magenta liquid crystal layer, and a yellow liquid crystal layer may be provided to exhibit full color. The color liquid crystal layer is composed of cholesteric liquid crystals, in which the pitch is controlled to reflect respective specific light wavelengths or guest-host liquid crystals added with a dichromatic dye having specific colors.

Using red, green and blue cholesteric liquid crystals, the reflective full color LCD, the transmissive full color LCD, or the transflective full color LCD may be fabricated. Alternatively, using red, green and blue guest-host liquid crystals, the reflective full color LCD, the transmissive full color LCD, or the transflective full color LCD may be fabricated.

The partition spacers 53 function to maintain the cell gap between the upper substrate 57 and the lower substrate 51 and to enable the separate reception of the respective color liquid crystal layers so as to prevent mixing of the adjacent color liquid crystal layers. As shown in FIG. 6, the partition spacers 53 may be formed into a stripe structure (a), a matrix structure (b), a delta structure (c), or other structures.

In addition, the absorbing layer 58 may be provided between the lower substrate 51 and the lower transparent electrode 52a, as shown in (a) of FIG. 5, or beneath the lower substrate 51, as shown in (b) of FIG. 5.

The adhesive layer 59 is obtained by forming the upper transparent electrode 52b on the upper substrate 57 and then applying an adhesive on a portion where no upper transparent electrode 52b is formed, that is, a portion facing the partition spacers 53 of the lower substrate 51.

FIG. 7 is a view showing the operation of the color liquid crystal layer formed of cholesteric liquid crystals. In the case where voltage is not applied to the color liquid crystal layer, the color liquid crystal layer has a planar texture, as shown in (a) of FIG. 7, and selectively reflects a predetermined wavelength according to Bragg's law so as to exhibit specific color. However, when liquid crystals are driven through the application of voltage, the liquid crystal phase is converted into a focal conic texture, as shown in (b) of FIG. 7, and, instead of the properties of selective reflection, all light wavelengths are transmitted and absorbed by the absorbing layer.

FIG. 8 is a view showing the exhibition of the full color by the LCD, in which three color liquid crystal layers constitute a single pixel.

In the case of a first pixel, when power is not applied to the red liquid crystal layer and blue liquid crystal layer but is applied to the green liquid crystal layer, red and blue colors are reflected and green color is absorbed. In this case, the first pixel may exhibit color as a result of mixing the red color with the blue color. On the other hand, in the case of a second pixel, when power is not applied to the green light crystal layer but is applied to the red liquid crystal layer and blue liquid crystal layer, the green color is reflected and red and blue colors are absorbed. In this case, the second pixel may exhibit the green color.

In the method of fabricating the reflective full color LCD according to the present invention, three embodiments are provided.

According to a first embodiment, the fabrication method includes forming partition spacers for defining pixels on a lower substrate, forming an adhesive layer on an upper substrate, injecting liquid crystals having different pitches between the partition spacers, and accurately aligning the upper substrate with the lower substrate to attach them to each other.

According to a second embodiment, the fabrication method includes forming partition spacers for defining pixels on a lower substrate, forming an adhesive layer on an upper substrate, injecting liquid crystals having the same pitch between the partition spacers, accurately aligning the upper substrate with the lower substrate to attach them to each other, and radiating UV light to change the pitch of the liquid crystals by subpixel.

According to a third embodiment, the fabrication method includes forming partition spacers for defining pixels on a lower substrate, forming an adhesive layer on an upper substrate, accurately aligning the upper substrate with the lower substrate to attach them to each other, injecting liquid crystals having the same pitch using a capillary phenomenon, and radiating UV light to change the pitch of the liquid crystals by subpixel.

Below, the processes of fabricating the reflective full color LCD according to the preferred embodiments of the present invention are particularly given with reference to the drawings.

FIGS. 9 to 14 show the process of fabricating the reflective full color LCD according to the first embodiment of the present invention.

As shown in FIG. 9, a lower transparent electrode 52a is formed on a lower substrate 51 at a portion where subpixels are formed. Further, after an alignment layer is formed on the lower transparent electrode 52a, the subsequent processes may be conducted.

As shown in FIG. 10, partition spacers 53 are formed on the lower substrate 51 in every portion where no lower transparent electrode 52a is formed. As such, spaces for subpixels are defined by the partition spacers 53, and the partition spacers 53 function to maintain a uniform cell gap between the lower substrate and the upper substrate.

In addition, the partition spacers 53 function to enable separate injection of the color liquid crystals into the respective subpixels so as to prevent the mixing of the color liquid crystals. Thus, a process for preparing a partition spacer is regarded as important. The process for preparing the partition spacer is exemplified by a photospacer process, including application of a photospacer and then photolithography, a polymer wall process, including irradiation of UV light to convert a monomer into a polymer so as to form a partition, or a combination of the photospacer process and the polymer wall process.

As shown in FIG. 11, color liquid crystals able to absorb or reflect respective specific light wavelengths are injected into the spaces defined by the partition spacers 53 so as to enable a single pixel composed of a plurality of subpixels to exhibit full color. As such, red liquid crystals, green liquid crystals and blue liquid crystals are injected into respective subpixels using color liquid crystal injectors 91, 92, 93, thereby forming a red liquid crystal layer 54, a green liquid crystal layer 55, and a blue liquid crystal layer 56.

As the color liquid crystals, cholesteric liquid crystals having different pitches may be used. Red, green and blue liquid crystals having different pitches are separately injected into the spaces defined between the partition spacers. In such a case, it is important that a technique able to precisely inject accurate amounts of liquid crystals into respective spaces be used. In the present invention, usable is an ink jet printing process, a slit coating process, or a process using a dispenser or an ODF (one drop filing) device.

As shown in FIG. 12, an upper transparent electrode 52b and an adhesive layer 59 are formed on the upper substrate 57. The upper transparent electrode 52b is formed on the upper substrate 57 at a position facing the lower transparent electrode 52a of the lower substrate 51, and the adhesive layer 59 is formed on the upper substrate 57 at a position facing the partition spacers 53 of the lower substrate 51. In addition, an alignment layer may be further formed on the upper transparent electrode 52b.

The adhesive layer 59 is formed by applying material able to be securely attached to the partition spacers, for example, a monomer or polymer, to be easily cured by heat or UV light, on the portion where no upper transparent electrode 52b is formed. The adhesive layer 59 is compressed and exposed to heat or UV light to cure it in the subsequent process of attaching the upper substrate and the lower substrate to each other.

As shown in FIG. 13, the product of FIG. 12 is inverted and then attached to the product of FIG. 11. To this end, the products are accurately aligned so that the partition spacers 53 face the adhesive layer 59 and the lower transparent electrode 52a faces the upper transparent electrode 52b. Thereafter, in such an alignment state, pressure is applied and heat or UV light is applied to attach the upper substrate 57 and the lower substrate 51 to each other.

As shown in FIG. 14, an absorbing layer 58 is formed beneath the lower substrate 51.

As mentioned above, when the absorbing layer 58 is formed beneath the lower substrate 51 as in FIG. 14, a reflective full color LCD is fabricated. In addition, when the process of forming the absorbing layer 58 is omitted, a transmissive full color LCD may result. In addition, the reflective full color LCD is combined with the transmissive full color LCD, leading to a transflective full color LCD.

In addition, the absorbing layer 58 may be formed upon the initial process by forming the absorbing layer on the lower substrate 51 and then forming the lower transparent electrode 52a.

In the first embodiment, the upper transparent electrode 52b and the adhesive layer 59 are formed on the upper substrate 57 at different portions so that they do not overlap, but the present invention is not limited thereto. As shown in FIG. 15, an upper transparent electrode 151 is deposited on an upper substrate at a position facing a lower transparent electrode, after which an adhesive layer 152 may be formed over the entire surface thereof.

FIGS. 16 to 22 show the process of fabricating the reflective full color LCD according to the second embodiment of the present invention.

The process of forming a lower transparent electrode 52a of FIG. 16 and the process of forming partition spacers 53 of FIG. 17 are the same as the processes of FIGS. 9 and 10 in the first embodiment, and thus a detailed description thereof is omitted.

As shown in FIG. 18, liquid crystals 101 having the same properties (pitch or color) are injected into the spaces defined by the partition spacers 53 using a liquid crystal injector 100.

As shown in FIG. 19, an upper transparent electrode 52b and an adhesive layer 59 are formed on the upper substrate 57. The process of FIG. 19 is the same as the process of FIG. 12 in the first embodiment, and thus a detailed description thereof is omitted.

As shown in FIG. 20, the product of FIG. 19 is inverted and then attached to the product of FIG. 18. To this end, the above products are accurately aligned so that the partition spacers 53 face the adhesive layer 59 and the lower transparent electrode 52a faces the upper transparent electrode 52b. Thereafter, in such an alignment state, pressure is applied and heat or UV light is applied to attach the upper substrate 57 and the lower substrate 51 to each other.

As shown in FIG. 21, photomasks 102, which allow different amounts of UV light to be transmitted therethrough, are disposed above the subpixels, respectively, after which UV light is radiated, thus changing the pitch of the liquid crystals 101. As such, the pitch of the liquid crystals injected into the subpixels is changed so that one pixel composed of the plurality of subpixels can exhibit full color and the color liquid crystals of the subpixels can absorb or reflect respective specific light wavelengths. In FIG. 21, the upper and lower substrates are shown in the exploded state in order to clearly depict the process of radiating different amounts of UV light onto the subpixels. However, the process of FIG. 21 is conducted when the upper and lower substrates are actually attached to each other, as in FIG. 20.

As shown in FIG. 22, an absorbing layer 58 is formed beneath the lower substrate 51.

Turning now to FIGS. 23 to 29, the process of fabricating the reflective full color LCD according to the third embodiment of the present invention is shown.

The process of forming a lower transparent electrode 52a of FIG. 23 and the process of forming partition spacers 53 of FIG. 24 are the same as the processes of FIGS. 9 and 10 in the first embodiment, and thus a detailed description thereof is omitted.

As shown in FIG. 25, an upper transparent electrode 52b and an adhesive layer 59 are formed on an upper substrate 57. The process of FIG. 25 is the same as the process of FIG. 12 in the first embodiment, and thus a detailed description thereof is omitted.

As shown in FIG. 26, the product of FIG. 25 is inverted and then attached to the product of FIG. 24. To this end, the products are accurately aligned so that the partition spacers 53 face the adhesive layer 59 and the lower transparent electrode 52a faces the upper transparent electrode 52b. Thereafter, in such an alignment state, pressure is applied and heat or UV light is applied to attach the upper substrate 57 to the lower substrate 51. As such, the third embodiment is characterized in that the upper substrate 57 and the lower substrate 51 are attached to each other in a state in which no liquid crystals are injected, compared to the above two embodiments.

As shown in FIG. 27, into the spaces defined by the partition spacers 53 between the upper substrate 57 and the lower substrate 51, which are attached to each other, liquid crystals 101 having the same pitch are injected using a capillary phenomenon, and then the injection inlet is plugged.

As shown in FIG. 28, photomasks 102, which allow different amounts of UV light to be transmitted therethrough, are disposed above the subpixels, respectively, after which UV light is radiated, thus changing the pitch of the liquid crystals 101. The process of FIG. 28 is the same as the process of FIG. 21 in the second embodiment, and thus a detailed description thereof is omitted.

As shown in FIG. 29, an absorbing layer 58 is formed beneath the lower substrate 51.

In the second and third embodiments, the upper transparent electrode 52b and the adhesive layer 59 are formed on the upper substrate 57 at different portions so that they do not overlap, but the present invention is not limited thereto. As shown in FIG. 15, the upper transparent electrode 151 is deposited on the upper substrate at a position facing the lower transparent electrode, after which the adhesive layer 152 may be formed over the entire surface thereof.

Further, although the first to third embodiments are described mainly using the color liquid crystal layer formed of cholesteric liquid crystals, guest-host liquid crystals may be used instead of the cholesteric liquid crystals. Such a guest-host LCD is an absorptive LCD, in which the guest-host liquid crystals comprise nematic or cholesteric liquid crystals as a host and a dichromatic dye as a guest. The dichromatic dye is a material in which light absorbance varies depending on the polarization direction.

FIG. 30 is a view showing the operation of the color liquid crystal layer using the dichromatic dye. In the guest-host liquid crystals, red, green and blue dichromatic dyes, as the guest, are injected into respective host liquid crystals. When white light is applied to such an LCD, red, green and blue wavelengths are absorbed, and thus cyan, magenta and yellow are represented as the complementary colors thereof.

The guest-host liquid crystals may be applied to the fabrication processes of FIGS. 9 to 14, FIGS. 16 to 22, and FIGS. 23 to 29, thus fabricating the LCD. That is, the guest-host liquid crystals containing red, green and blue dichromatic dyes may be injected into the respective subpixels in FIG. 11. Alternatively, the host liquid crystals may be injected into all subpixels in FIG. 18 or 27, and then a dichromatic dye having a desired color may be added to the subpixels, instead of UV light being radiated, in FIG. 21 or 28. Thereby, LCDs using the guest-host liquid crystals may be fabricated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of fabricating a full color liquid crystal display, comprising:
    a lower substrate formation step of forming one lower transparent electrode on a lower substrate at a portion where each of the subpixels is formed;
    a space formation step of uniformly arranging one partition spacer on the lower substrate at each portion where no lower transparent electrode is formed to form space between the partition spacers;
    an upper substrate formation step of forming one upper transparent electrode on an upper substrate at a portion facing the respective lower transparent electrode;
    an adhesive layer formation step of forming a plurality of adhesive layers on the upper substrate, each of the adhesive layers formed at the portion facing each of the partition spacers;
    an attachment step of inverting a product of the adhesive layer formation step and aligning it with a product of the space formation step such that the partition spacers face the adhesive layer and the lower transparent electrode faces the upper transparent electrode to attach the products to each other; and
    a color liquid crystal layer formation step of separately receiving liquid crystals able to reflect or absorb respective specific light wavelengths into the spaces defined between the partition spacers to form subpixels, and forming a color liquid crystal layer such that a single pixel composed of a plurality of adjacent subpixels exhibits full color,
    wherein the color liquid crystal layer formation step comprises injecting liquid crystals having same properties into the spaces defined between the partition spacers after the space formation step, and changing pitch of the liquid crystals injected into the subpixels by radiating different amounts of UV light onto the subpixels respectively after the attachment step; and
    wherein the liquid crystals reflect or absorb the respective specific light wavelengths by being changed texture according to an applied voltage after radiating the UV light.

2. The method according to claim 1, wherein the liquid crystals are cholesteric liquid crystals.

3. A method of fabricating a full color liquid crystal display, comprising:
    a lower substrate formation step of forming one lower transparent electrode on a lower substrate at a portion where each of the subpixels is formed;
    a space formation step of uniformly arranging one partition spacer on the lower substrate in a portion where no lower transparent electrode is formed to form space between the partition spacers;
    an upper substrate formation step of forming one upper transparent electrode on an upper substrate at a portion facing the respective lower transparent electrode;
    an adhesive layer formation step of forming a plurality of adhesive layers on the upper substrate, each of the adhesive layers formed at the portion facing each of the partition spacers;
    an attachment step of inverting a product of the adhesive layer formation step and aligning it with a product of the space formation step such that the partition spacers face the adhesive layer and the lower transparent electrode faces the upper transparent electrode to attach the products to each other; and
    a color liquid crystal layer formation step of separately receiving liquid crystals able to reflect or absorb respective specific light wavelengths into the spaces defined between the partition spacers to form subpixels, and forming a color liquid crystal layer such that a single pixel composed of a plurality of adjacent subpixels exhibits full color,
    wherein the color liquid crystal layer formation step comprises injecting liquid crystals having same properties into the spaces defined between the partition spacers and then changing pitch of the liquid crystals injected into the subpixels by radiating different amounts of UV light onto the subpixels respectively, after the attachment step; and
    wherein the liquid crystals reflect or absorb the respective specific light wavelengths by being changed texture according to an applied voltage after radiating the UV light.

4. The method according to claim 3 wherein the liquid crystals are cholesteric liquid crystals.

5. The method according to claim 3 wherein the liquid crystals are injected using a capillary phenomenon into the spaces.

* * * * *